Jan. 11, 1944.  W. M. BUSHNELL  2,339,144
CUTTING TOOL
Filed Oct. 4, 1943
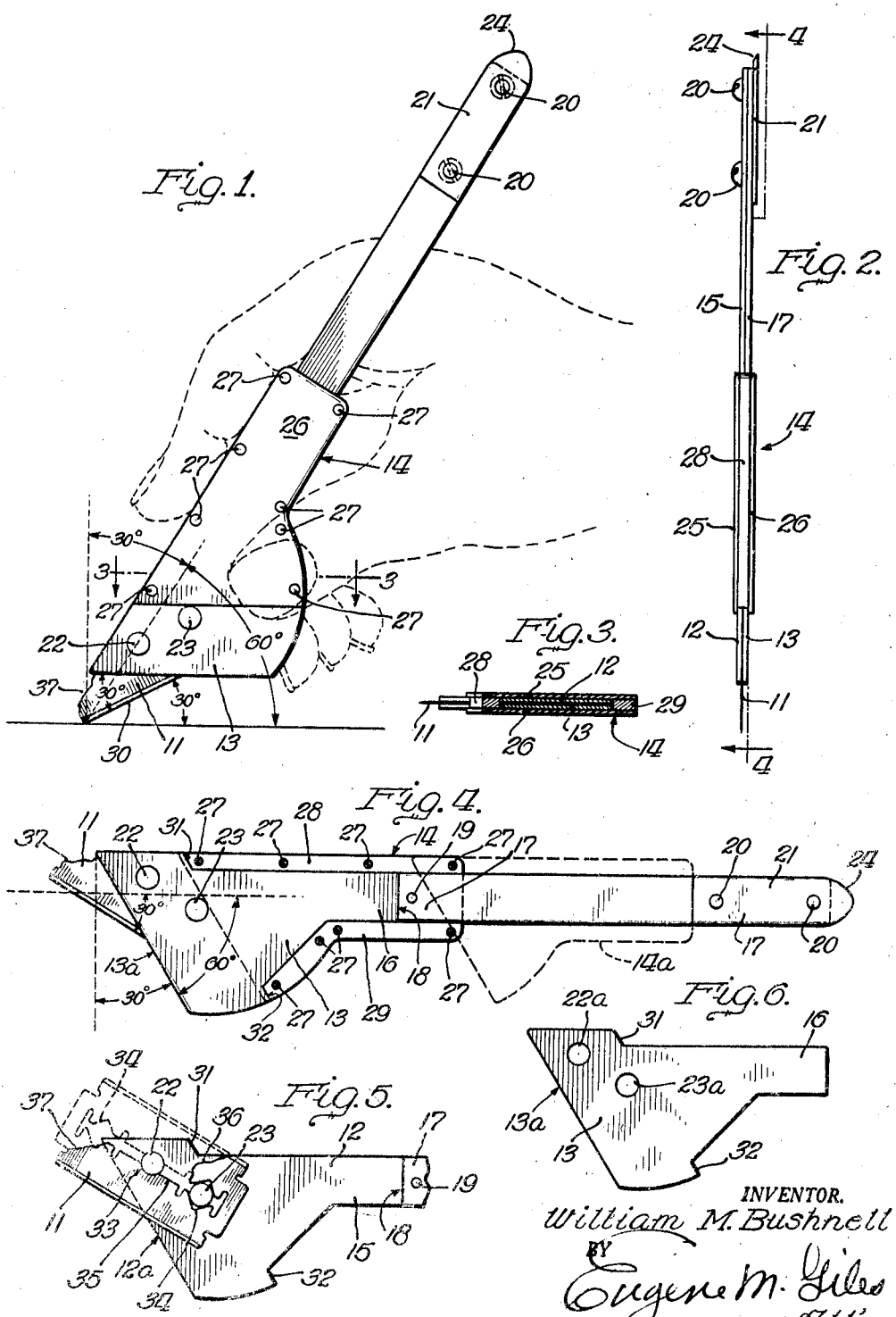
INVENTOR.
William M. Bushnell
BY
Eugene M. Giles
Atty.

Patented Jan. 11, 1944

2,339,144

UNITED STATES PATENT OFFICE 2,339,144

CUTTING TOOL

William M. Bushnell, Chicago, Ill.

Application October 4, 1943, Serial No. 504,843

7 Claims. (Cl. 30—339)

My invention relates to a cutting tool for manual use and has reference more particularly to a tool of this character which is especially advantageous for use by paper hangers in cutting and trimming wall paper although it may be used for other purposes. The invention also includes replaceability of the blade which is of special form and may be readily produced from a conventional form of double-edged safety razor blade.

The principal objects of my invention are, to provide an improved cutting tool which is particularly suitable for use by paper hangers in the cutting and trimming of wall paper; to insure proper angularity of the cutting edge with respect to the handle so that when the tool is manually operated the cutting edge has a suitable drawing angle to cut readily without mutilation; to provide a form of blade that facilitates cutting in corners and with flexibility that permits accurate cutting along a straight edge or other guide; to provide a blade holder by which the cutting edge is readily held in the proper cutting direction; to permit convenient removal and replacement of the blade; and to provide a holder capable of utilizing conventional double-edged razor blades by merely breaking off a portion thereof, these and other objects being accomplished as pointed out more fully hereinafter and as shown in the accompanying drawing in which:

Fig. 1 is a side view of the cutting tool in the cutting position and showing the manner in which it is manually held;

Fig. 2 is a rear edge view of the holder looking at same from the left of Fig. 1;

Fig. 3 is a sectional view on the line 3—3 of Fig. 1;

Fig. 4 is a view taken on the line 4—4 of Fig. 2 showing the nearest side wall of the locking slide removed and also showing in dotted lines the locking slide in the retracted position;

Fig. 5 is a fragmentary view showing one of the clamping plates between which the blade is held; and Fig. 6 is a similar view of the other clamping plate.

Referring to the drawing, the reference numeral 11 indicates the blade, 12 and 13 the clamping plates between which the blade is held and 14 the locking slide by which the clamping plates 12 and 13 are retained in clamping relation against the opposite sides respectively of the blade 11.

The clamping plates are of sheet metal or similar relatively stiff material and are of the same shape except that the clamping plate 12 has a long flat stemlike extension 15 integral therewith whereas the clamping plate 13 has only a short stem extension 16. To the extension 15 is secured a long narrow plate 17 of the same thickness as the clamping plate 12 and terminating at 18 so that when the clamping plate 13 is placed with the end of the short stem 16 thereof against the end 18 of the plate 17, the clamping plate 13 coincides with the corresponding portion of the clamping plate 12.

The plate 17 may be secured to the stem 15 in any desired manner as for example by a rivet 19 engaged through the two plates at the inner end of the plate 17 and by screw 20 at the outer end which said screws, in addition to securing the plates 15 and 17 together, serve to attach a combination stop member and marker 21 thereto.

The clamping plate 12 has a pair of studs 22 and 23 thereon which engage corresponding apertures 22ᵃ and 23ᵃ of the clamping plate and these studs 22 not only serve to locate and retain the blade 11 between the clamping plates 12 and 13 but also, by engagement with the aperture 22ᵃ and 23ᵃ, serve to retain the clamping plate 13 in coinciding relation with the clamping plate 12.

The slide 14, which is in the form of a thin walled sheath, normally occupies the position shown in Figs. 1 and 2, and also in full lines in Fig. 4, in which it is telescoped over most of the clamping plate 13 and holds the latter in sufficiently close proximity to the clamping plate 12 to clamp the blade 11 therebetween. This slide 14 however is retractable along the stem 15, 17 to a position, shown in dotted lines in Fig. 4, in which it is entirely withdrawn from the clamping plate 13 so that the latter is then free to be removed for removing and replacing the blade 11. For limiting the retraction of the slide 14, the stop member 21 is provided on the outer end of the stem 15, 17 and this stop member, which is in the form of a plate, preferably has the outer end projecting beyond the composite stem 15, 17 and provided with a somewhat pointed and slightly sharpened end substantially as shown at 24 which is useful to press wall paper into corners and crease or mark it where it is to be cut.

This slide 14 may be of any desired construction as for example it may consist of opposed side plates 25 and 26 riveted together as at 27 through spacers 28 and 29 which are interposed between the lateral margins of the plates and held them in the proper separated relation to snugly confine the clamping plates 12 and 13 and the composite stem 15, 17 therebetween.

In the use of this cutting tool it is held substantially as shown in Fig. 1 with the stem portion 15, 17, which serves somewhat as a handle, leaning slightly in the direction of cutting movement at an angle of approximately 30° to the vertical or 60° to the surface of the work, and the lower margins 12ª and 13ª of the clamping plates 12 and 13 are at a suitable angularity (approximately 60°) to the stem or handle 15, 17 so that in the normal cutting position of Fig. 1 these margins are substantially parallel to the surface of the work. Moreover, the clamping plates 12 and 13 are quite wide at their lower ends and the slide 14 is correspondingly formed so that at the lower end of the tool there is a substantial bulge at the front in a position to be naturally engaged between the thumb and fingers as shown, and as the blade projects from between the rear portions of the clamping plates in the cutting position, this bulge serves to facilitate guiding the blade in the cutting operation and insures accuracy of cutting.

The blade is arranged in the holder so that the cutting edge 30 thereof is at a substantial angle (approximately 30° as shown in Fig. 4) to the axis of the handle or stem 15, 17 and extends rearwardly to form an acute angle of approximately 30° with the work surface (and with the margins 12ª and 13ª of the clamping plates 12 and 13) when the tool is held in the normal and natural position for cutting and thus the blade cuts through the work at a drawing angle which insures a clear cut without mutilation of the paper. It will also be noted that the point of the blade is near the extreme rear of the tool and by reason thereof the guiding of the cutter by the bulge at the front of the holder is enhanced.

The clamping plates 12 and 13, when held in the clamping position by the slide 14, extend a substantial distance beyond the lower end of the slide as shown so that the blade 11 lies almost entirely between the free ends of the clamping plates 12 and 13 and accordingly the end structure is quite thin. These so called free ends are cut back along their inner limits as indicated at 31 and 32 to form stops for limiting the outward movement of the slide 14, which fits sufficiently snugly upon the clamping plates 12 and 13 to remain in the adjusted position against the stops 31 and 32. Moreover, it will be noted that in the use of this tool the pressure thereon is in a direction to hold the slide 14 against these stops and there is accordingly no danger of the slide being retracted and the blade disengaged while the tool is in use.

The blade 11 may be made especially for this holder but the latter is designed so that a conventional form of double-edged razor blade may be employed by merely breaking off portions thereof. Such conventional double-edged razor blades, the broken away portions of which are shown in dotted lines in Fig. 5, are commonly made with a central opening 33 and two end openings 34 and a longitudinal central slot 35, and the studs 22 and 23 of my holder are properly located to engage respectively the central opening 33 and one of the end openings 34 of such a razor blade and thereby hold the blade with one edge 30 thereof at the proper angle for my cutting purposes. For my purpose, however, a portion of the razor blade must be broken away as for example along the broken lines 36 and 37 leaving only that portion of the blade shown in full lines, and this may be accomplished quite readily by holding the blade first along one side of the broken line 36 with pliers and bending the blade at the opposite side until it breaks and then holding the blade along one side of the broken line 37 with pliers and bending the blade at the opposite side until it breaks which thus severs the dotted line portion of the blade from the full line portion thereof.

By thus breaking the blade the portion thereof beyond the line 36 which would otherwise obstruct the closing of the slide 14 down against the stop 31 is removed and at the other end the breaking of the blade along the line 37 leaves a pointed end to project from the holder which is the desired form of cutter for the purpose for which this cutter is particularly intended.

The breaking of the blade along the lines 36 and 37 obliterates the opening 34 at the outer end and leaves only a notch at one side of the opening 33 whereas the opening 34 at one end is retained for engagement with the stud 23. What remains of the opening 33 however engages the stud 22 which provides a bearing to resist displacement of the blade in the cutting operation and it will also be noted that a heel portion of the blade remains when broken along the line 36 so that when the slide 14 is in the position against the stops 31 and 32 this heel portion is confined by the lower end of the spacer 28 so that the blade cannot rotate to any substantial extent around the stud 23 or move substantially away from the operative position against the stud 22. Thus, by reason of the stud 22 the mutilated blade is prevented from displacement swinging about the stud 23 in one direction, and the heel of the mutilated blade, or the portion remaining where it is broken away at 36, by its proximity to the outer end of the spacer 28 prevents any substantial displacement of the mutilated blade in the other direction, and of course the clamping engagement of the plates 12 and 13 against the opposite sides of the mutilated blade tends to retain the blade in the position in which it is installed in the holder.

From the foregoing it will be understood that I have provided a simple and convenient blade holder capable of utilizing a conventional double-edged razor blade by merely breaking away a portion thereof in a manner that is quite readily accomplished. Moreover the holder is designed so that the blade is securely and safely held at a highly efficient cutting angle so that it cuts readily without tearing the work and with a pointed end that is most convenient for use by paper hangers for cutting wall paper. Because of the flexibility of the blade it aligns itself readily with a straight edge and with the bulge arrangement located to be engaged between the thumb and fingers and well in advance of the cutting edge the cutting may be accomplished more accurately than with previous cutters of this character.

While I have shown and described my invention in a preferred form, I am aware that various changes and modifications may be made without departing from the principles of my invention, the scope of which is to be determined by the appended claims.

What is claimed is:

1. In a cutting tool of the class described the combination of a stemlike handle having at the end a blade holding head the outer edge of which is disposed at an acute angle to the longitudinal axis of the stemlike handle, and a blade mounted in said head and projecting outwardly through said edge thereof, said blade having a cutting edge disposed at an acute angle to said edge of the head and at an angle of greater acuteness to the longitudinal axis of the stemlike handle.

2. In a cutting tool of the class described the combination of a stemlike handle having at the end a blade holding head the outer edge of which is disposed at an acute angle to the longitudinal axis of the stemlike handle, and a blade mounted in said head and projecting outwardly through said edge thereof, said blade having a cutting edge disposed at an acute angle to said edge of the head and at an angle of greater acuteness to the longitudinal axis of the stemlike handle, said head having an enlargement ahead of the blade for directionally guiding the latter in the cutting movement thereof.

3. In a cutting tool of the class described the combination of a stemlike handle having at the end thereof a blade holding head the outer edge of which is disposed at an acute angle to the longitudinal axis of the stemlike handle, and a blade mounted in said head and projecting outwardly through said edge thereof, said blade having a cutting edge disposed at an acute angle to said edge of the head and at an angle of greater acuteness to the longitudinal axis of the stemlike handle, said cutting edge leading outwardly from said edge of the head at a point approximately midway between the ends of said latter edge and terminating at a substantially pointed blade end which is approximately opposite one end of said latter edge.

4. In a cutting tool of the class described, the combination of a stemlike handle having at the end thereof a flat blade holding head of substantially greater width than the stemlike handle and with an elongated outer edge, a blade having a generally triangular portion projecting through said elongated outer edge between the center and one end thereof and said blade having a cutting edge extending angularly outward from the approximate center of said elongated outer edge at an acute angle to said latter edge.

5. In a cutting tool of the class described, the combination of a stemlike handle having at the end thereof a flat blade holding head of substantially greater width than the stemlike handle and with an elongated outer edge, one side of said blade holding head being removable, a sheath telescoped over said removable side to hold it in clamping relation to the other side of the blade holding head, said sheath being slidable lengthwise of said stemlike handle to release said removable side of the blade holding head, a removable blade clamped between the two aforesaid sides of the blade holding head, and means by which the blade is locked in the clamped position with a cutting edge thereof extending outwardly from the approximate center of the aforesaid elongated outer edge at an acute angle thereto.

6. In a cutting tool of the class described, the combination of a handle having a pair of separable, correspondingly contoured clamping plates at one end, means for releasably holding said plates in superposed clamping relation, and a blade removably secured between said plates and comprising a thin mutilated double-edged razor blade of the type having a longitudinal central slot with three spaced enlargements of the slot, one of which enlargements is midway between the other enlargements, said blade being broken away at one side of said slot nearly to one of said other enlargements and beyond the other of said other enlargements and means between the clamping plates engaged with remaining enlargement portions of the mutilated blade for holding the mutilated blade in a predetermined angular cutting position.

7. In a cutting tool of the class described, the combination of a handle having a pair of separable, correspondingly contoured clamping plates at one end, means for releasably holding said plates in superposed clamping relation, and a blade removably secured between said plates and comprising approximately a diagonal half of an elongated substantially rectangular double-edged razor blade having the larger end thereof pivotally engaged between the clamping plates and the smaller end projecting outwardly from said clamping plates.

WILLIAM M. BUSHNELL.